A. SUNDH.
POWER MECHANISM.
APPLICATION FILED MAY 18, 1909.
1,011,664.
Patented Dec. 12, 1911.
7 SHEETS—SHEET 1.
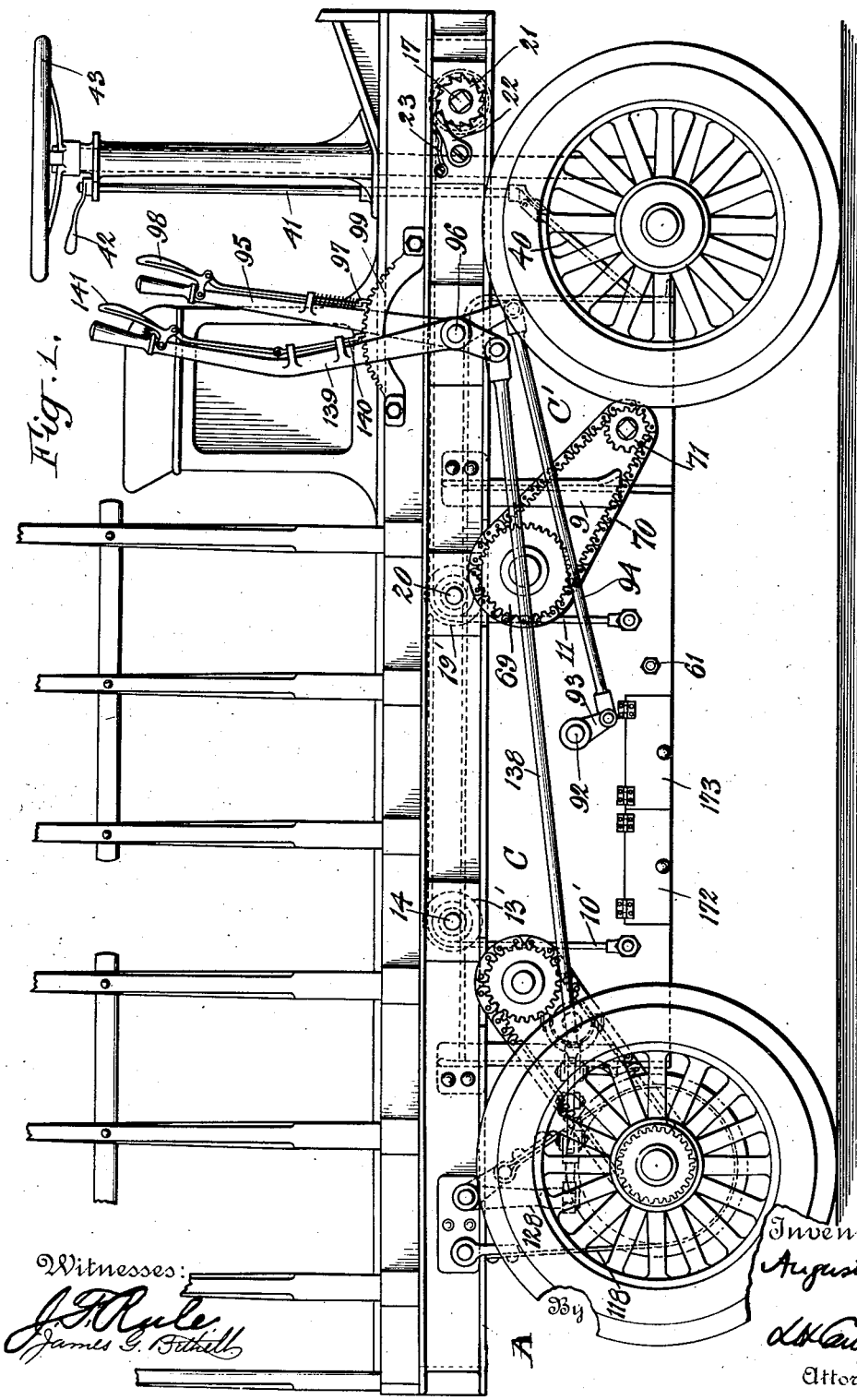

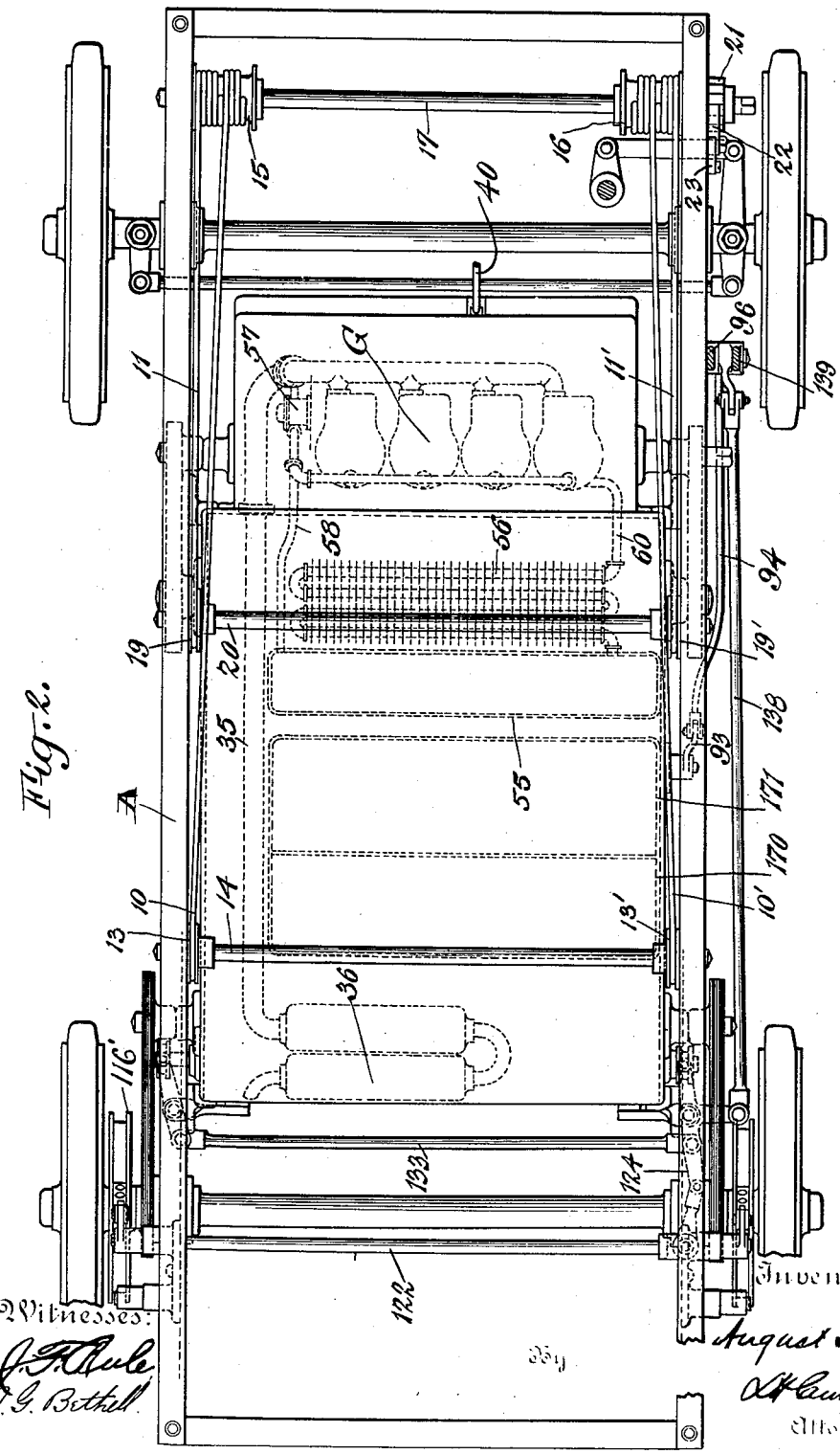

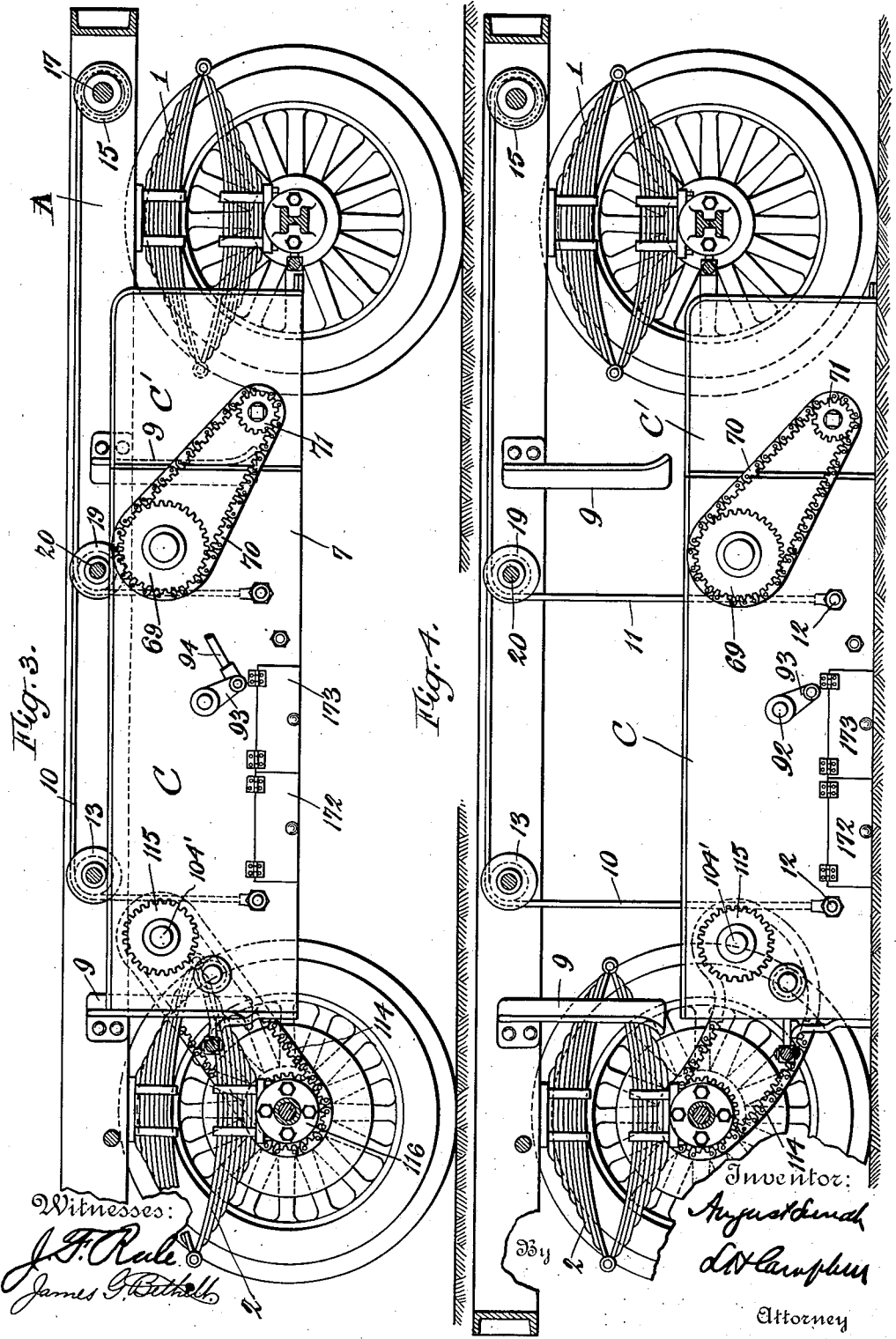

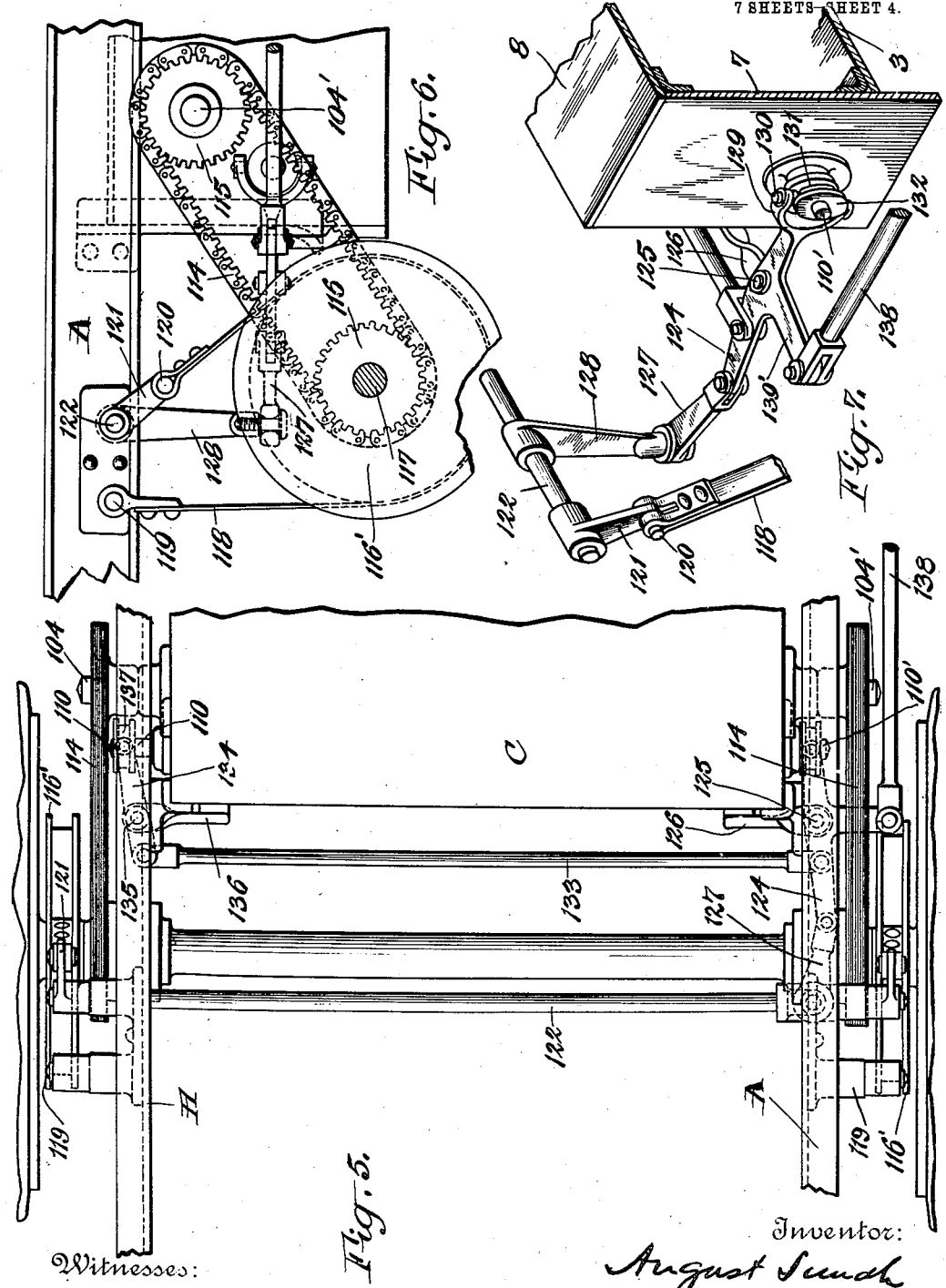

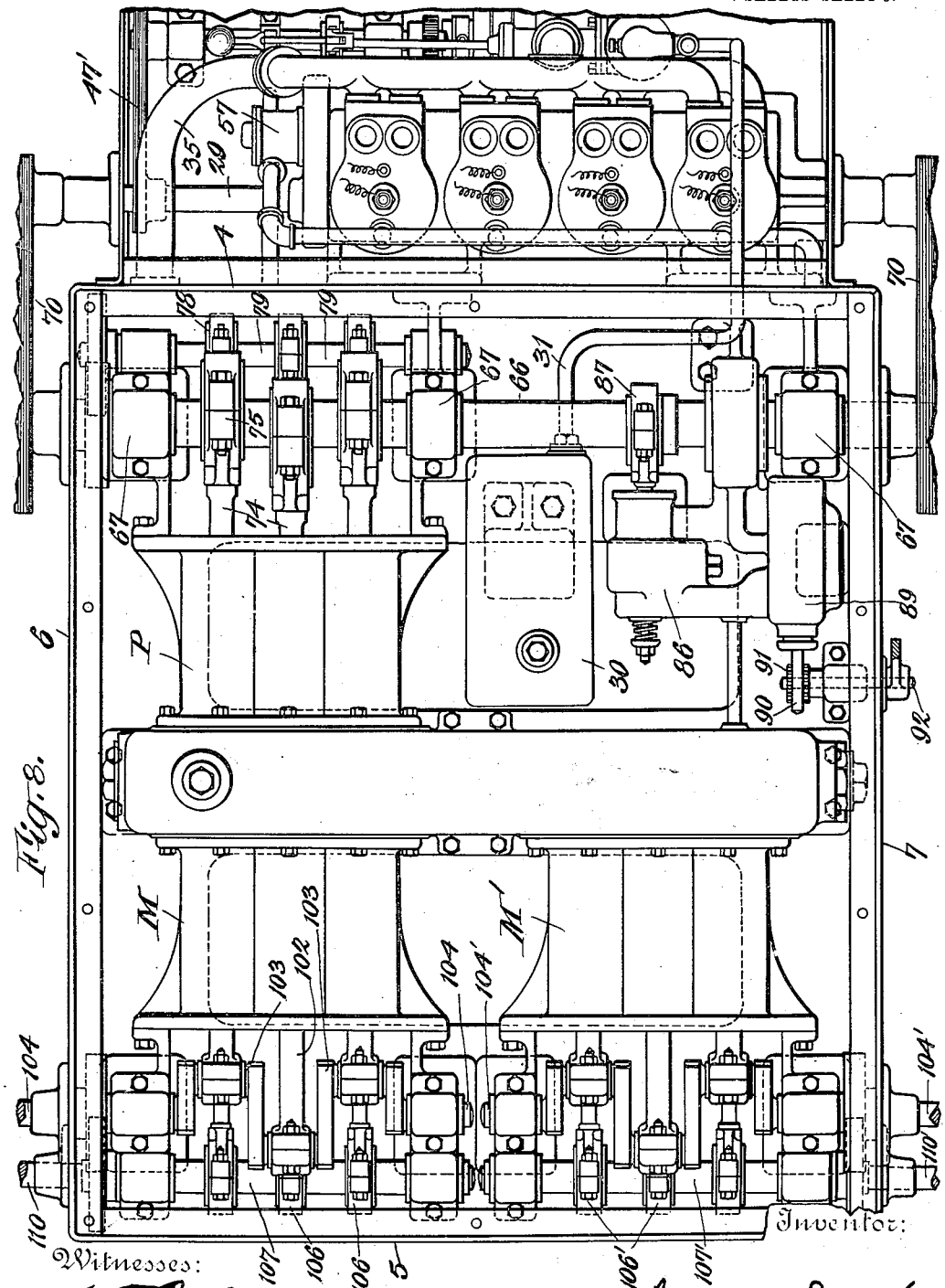

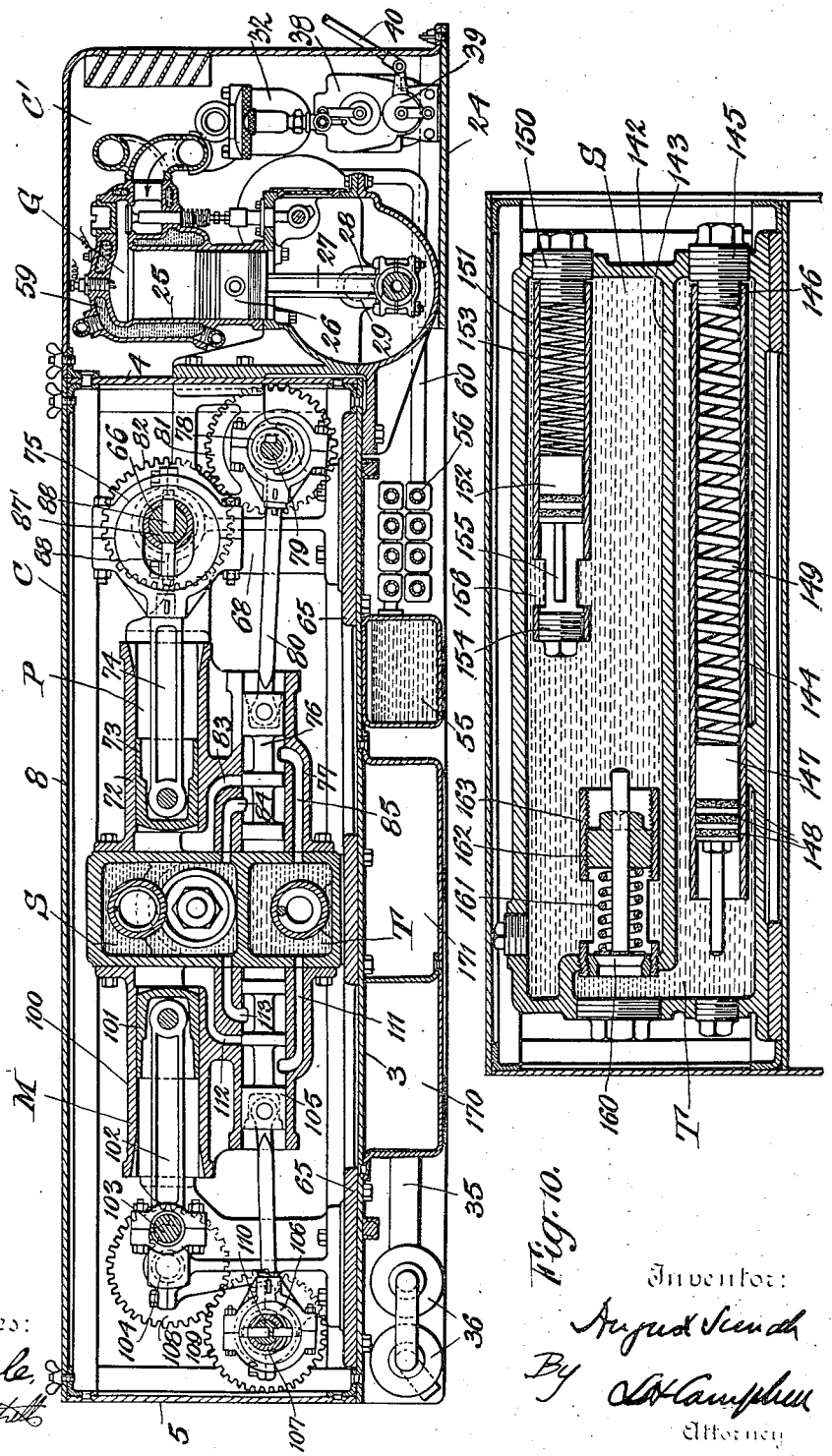

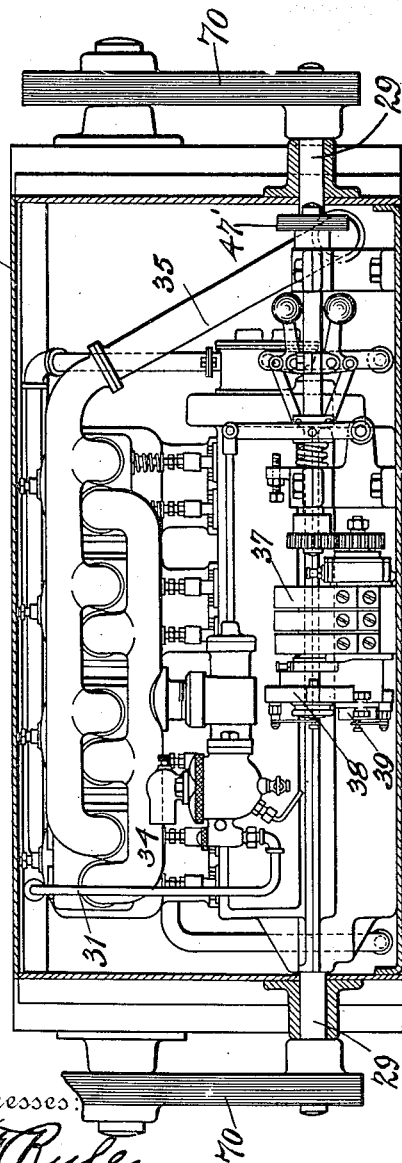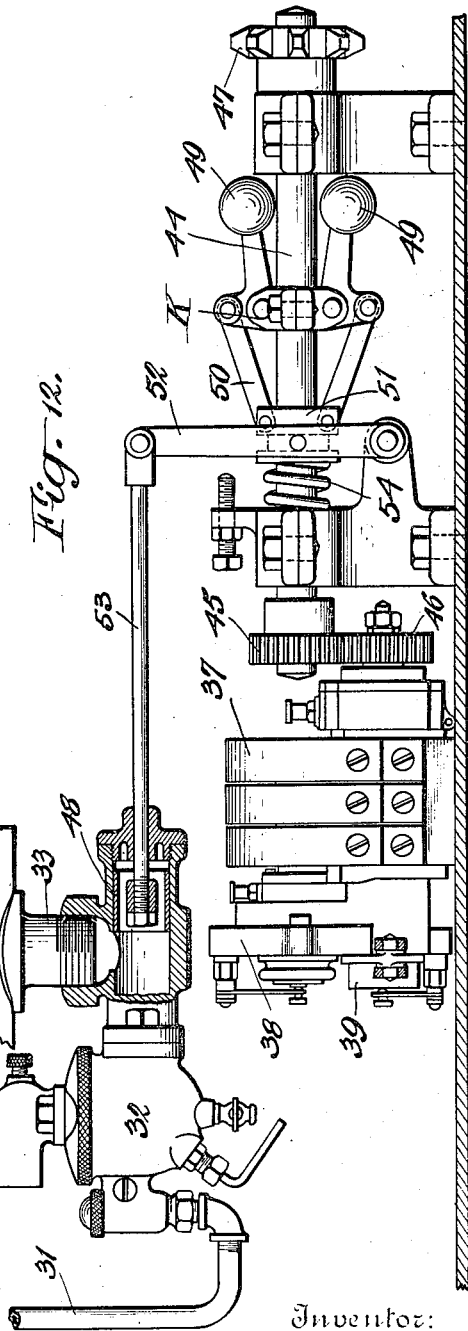

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

POWER MECHANISM.

1,011,664.  Specification of Letters Patent.  Patented Dec. 12, 1911.

Application filed May 18, 1909. Serial No. 496,832.

*To all whom it may concern:*

Be it known that I, AUGUST SUNDH, a citizen of the United States, residing in Yonkers, in the county of Westchester and State of New York, have invented a new and useful Improvement in Power Mechanism, of which the following is a specification.

My invention relates to power transmission mechanism operated by a prime mover, and adapted to be connected to machinery to be driven. The driven machinery may be the hoisting mechanism of an elevator system, the driving shaft of an automobile truck or other self-propelled vehicle, the propellers of a motor boat or various other devices.

One of the objects of the invention is to embody the prime mover and power transmission mechanism in a single unit, or as nearly as possible in one unit, and to adapt them to be readily connected to or disconnected from the machinery to be driven thereby permitting the prime mover and transmitting mechanism to be removed for repairs, or replaced by a new unit at little inconvenience and loss of time.

The invention is herein shown applied to an automobile truck, as it is well adapted for this use. It is of great value for use on motor vehicles owing to the frequent alterations and repairs that are required for the power mechanism of such vehicles. I have shown a variable speed fluid transmission gearing, as the same is well adapted for use on automobile trucks, but it will be understood that other forms of power transmission mechanism may be used.

The invention further comprises a novel arrangement for controlling the fluid operated motors in combination with the control of the brake mechanism.

Other features of the invention will appear hereinafter, the novel combinations of elements are set forth in the appended claims which define the exact nature and scope of the invention.

In the accompanying drawings, Figure 1 is a side elevation of an automobile truck with the present invention applied thereto; Fig. 2 is a plan view of the same; Fig. 3 is a sectional side elevation showing the casing containing the prime mover and power transmission mechanism in normal position; Fig. 4 is a similar view showing the said casing and inclosed mechanism lowered for removal; Fig. 5 is a fragmentary plan view of the rear portion of the truck, showing the mechanism used in the combined control of the motors and brake mechanism; Fig. 6 is a fragmentary elevation view of parts shown in Fig. 5; Fig. 7 is a perspective view of parts shown in Fig. 5; Fig. 8 is a plan view of the prime mover and power transmission mechanism; Fig. 9 is a longitudinal sectional elevation of the same; Fig. 10 is a sectional elevation view of the supply and pressure chambers; Fig. 11 is a front sectional elevation showing the prime mover and controlling mechanism therefor; Fig. 12 is an elevation view on an enlarged scale of the speed governor and associated parts.

The automobile truck comprises a frame A carried on heavy front and rear springs 1 and 2, supported by the front and rear axles, respectively. The prime mover is preferably an internal combustion engine G which may be of any preferred type. As herein shown a four-cylinder engine is used, the particular construction of which need not be described in detail. The power transmission gearing comprises pumping mechanism P, the pressure chamber T, a supply chamber S, and motors M and M', the latter being adapted to be operated by liquid forced from the pumping mechanism into the pressure chamber T, and from thence to the motors. The power transmission mechanism is inclosed in a casing C, comprising a bottom 3, front and rear end walls 4 and 5, respectively, side walls 6 and 7, respectively, and a removable top or cover 8. The engine G is inclosed in a casing C' which is riveted to or otherwise rigidly connected with the casing C. It will thus be seen that the engine G, the transmission gearing comprising the pumping mechanism and motors, are all inclosed in a casing adapted to be connected to or removed from the frame of the automobile truck. Rigidly secured to the frame A are vertically disposed angle irons 9, in position to engage the four corners of the casing C. The transmission mechanism and engine inclosed in the casing C and C' are supported by ropes or cables 10, 10' and 11, 11', removably connected to the sides of the casing C by fastenings 12. The ropes 10, 10' extend over guide sheaves 13 and 13' secured to a shaft 14, journaled in the frame A and from thence extend forward and are wound on drums 15 and 16 secured to a shaft 17 journaled in the front end of the frame. The ropes 11 and 11' are likewise carried over guide sheaves 19 and 19' secured to a shaft 20, and extend forward and are wound on the drums 15 and 16. The shaft 17 has secured thereto outside the frame A a ratchet wheel 21 normally engaged by the pawl 22, pivoted to the frame, and held in contact with the ratchet by means of a spring 23. The shaft 17 with the drums 15 and 16 is thus locked in position to support the mechanism carried by the ropes 10 and 10', and 11 and 11'. The end of the shaft 17 is squared to receive a crank for rotating the shaft to lift or lower the power transmission mechanism. This crank may conveniently be the one ordinarily used in starting the engine G.

The engine G may be supported on the floor 24 of the casing C', and is also preferably bolted to the front wall 4 and the bottom 3 of the casing C. The engine as herein shown comprises four cylinders 25, in which reciprocate pistons 26 connected by piston rods 27 to cranks 28 on the driving shaft 29 of the engine. Fuel is supplied to the engine from a gasolene tank 30, Fig. 8, through a pipe 31 which leads from the tank to the carbureter 32. From the carbureter the vaporized fuel is led through pipes 33 and 34 to the combustion chambers or cylinders of the engine. After combustion the fuel is led through an exhaust pipe 35 downwardly and rearwardly to a pair of twin mufflers 36 located beneath the rear end of the casing C.

The sparks for igniting the fuel are produced by a magneto 37. A distributer 38 and spark advancer or timer 39 are also provided, the latter being operated through a link 40 connected to a crank arm on the lower end of a vertical rock shaft 41, provided at its upper end with an operating lever 42 located beneath the steering wheel 43. The magneto 37 is geared to the governor shaft 44 by means of spur gears 45 and 46. The governor shaft is provided with a sprocket wheel 47 geared to the driving shaft of the engine by means of a sprocket chain 47' (Fig. 8). The speed governor K operates in a well-known manner to maintain the speed of the engine substantially constant by operating a valve 48 controlling the supply of fuel to the engine. If the speed of the engine becomes excessive the governor balls 49 are thrown outward by centrifugal force, and operate through the links 50 to move the sleeve 51 to the left. The sleeve carries the lever 52, piston rod 53 and piston 48 to the left to partially cut off the supply of fuel, and effect a reduction in the speed of the engine. As the speed is reduced the valve 48 is moved to the right by means of a coil spring 54.

A circulating system for keeping the temperature of the engine down is provided, which comprises a water tank 55 and a radiator 56, which are conveniently located beneath the casing C. A small pump 57 draws water from the tank 55, through a supply pipe 58 and forces it through the water jackets 59 surrounding the engine cylinders, and from thence it is returned through the pipe 60, and radiator 56 to the tank. Water is supplied to or removed from the tank 55 by means of an opening extending through the casing C and adapted to be closed by a plug 61 (Fig. 1).

The power transmission mechanism located within the casing C is substantially the same as that fully illustrated and described and claimed in my co-pending application for patent, Serial No. 496,357, filed May 17, 1909, entitled hydraulic variable and differential speed gears.

The mechanism within the casing C is preferably mounted on a base plate 65 bolted to the bottom 3 of the casing. A hollow driving shaft 66 for the pumping mechanism is mounted in bearings 67 on standards 68 bolted to the base plate 65. The ends of the driving shaft 66 extend through the sides 6 and 7 of the casing, and have secured thereto sprocket wheels 69 connected by sprocket chains 70 to sprocket wheels 71 on the ends of the engine shaft 29. The pumping mechanism comprises cylinders 72 in which reciprocate pistons 73 connected by the piston rods 74 to eccentrics 75 adjustably mounted on the driving shaft 66. Slide valves 76 adapted to reciprocate in the valve casing 77 are operated by eccentrics 78 keyed to a shaft 79. The eccentrics 78 are operatively connected to the valves by means of rods 80, each pivoted at one end to a valve and connected at its opposite end to an eccentric strap of an eccentric 78. The shaft 79 is driven from the shaft 66 by means of intermeshing spur gear wheels 81 and 82 keyed to the shafts 79 and 66, respectively. A much more compact arrangement of parts is in this way obtained than is possible when the eccentrics for operating the valves are mounted on the main driving shaft.

When the pumping mechanism is in operation the pump pistons 73 and the valves 76 are reciprocated. During the outward travel of a pump piston its valve 76 is at the right of the position shown in Fig. 9, so that communication is established between the supply chamber S and the pump cylinder by way of the ports 83 and 84, and liquid is drawn from the supply chamber into the cylinder behind the piston. During the return movement of the piston 73 the valve 76 is in a position to the left of that shown in Fig. 9, so that the pump cylinder is in communication with the pressure chamber through the passages 83 and 85, and the liquid is forced from the pump cylinder into the pressure chamber. The liquid employed is preferably a light oil, although water or other liquid may be used if desired. The eccentrics 75 are preferably made adjustable on the driving shaft in order to vary the rate at which the liquid is pumped into the pressure tank. The means for adjusting these eccentrics may comprise a small pump 86 (Fig. 8) driven by an eccentric 87, mounted on the shaft 66. The liquid from the pump 86 may be directed to the hollow shaft 66 and operate to force a piston rod 87' longitudinally in the shaft. The rod 87' coöperates with the cam projections 88 engaging inclined surfaces formed by slots in said rod so that longitudinal movement of the rod effects a transverse movement to the eccentric. The circulation of liquid from the pump 86 is controlled by a valve within the valve casing 89. This valve has a valve stem 90 provided with rack teeth engaging toothed segment 91 secured to a rock shaft 92 journaled in the side of the casing C. A rock arm 93 is secured to the shaft 92 outside of the casing and is connected by a rod 94 to a hand lever 95 pivoted at 96 to the frame of the machine. By rocking the lever 95 the valve in the casing 89 may be moved into position to admit fluid from the pump 86 to the hollow shaft 66, thereby effecting an adjustment of the eccentrics 75 to any desired position. The valve may then be moved into position to cut off the supply of liquid to the shaft 66, and thus hold the eccentrics in adjusted position. In this way the operation of the pumping mechanism, and therefore the speed of the automobile, may be regulated and controlled by operating the lever 95. The latter may be locked in any desired position by means of a locking pawl 97 operated by a finger lever 98, and coöperating with a segmental rack 99 secured to the frame of the machine. The mechanism for adjusting the eccentrics 75 is illustrated and described in detail in my co-pending application above referred to.

The motors M and M' are similar in construction to the pumping mechanism. The two motors are substantially alike in construction and operation. The motor M for example comprises cylinders 100 in which reciprocate pistons 101 connected by links 102 to cranks 103 on the crank shaft 104. Associated with each motor cylinder is a reciprocating valve 105 connected to be driven by an eccentric 106 adjustably mounted on a hollow shaft 107. The latter is driven from the crank shaft 104 by means of intermeshing spur gear wheels 108 and 109, secured to the shafts 104 and 107, respectively. The construction of the eccentrics 106 is substantially like that of the eccentrics 75. The eccentrics 106 are adjusted by a longitudinal movement of the cam rod 110 in the hollow shaft 107.

In operation the motor M is driven by fluid under pressure supplied from the tank T. During the outward stroke of the motor piston 101, the valve 105 (Fig. 9) is to the right of the position shown, so that the pressure chamber is in communication through the passages 111 and 112 with the motor cylinder and the piston is driven outward by the pressure of the liquid. During the return stroke of the piston the valve 105 is at the left of the position shown, so that communication with the pressure chamber is cut off, and communication with the supply chamber established through the passage 113. Liquid from the motor cylinder can therefore be returned to the supply chamber. The motor M' operates in a like manner to drive the crank shaft 104'. The shafts 104, 104' are geared to the driving axle of the machine by means of sprocket chains 114 running over sprocket wheels 115 and 116 secured to the crank shaft and driving axle, respectively. When the motor valves 105 are given a full throw the passages 112 are fully opened during each stroke of the motor pistons, and the full driving power of the motor will be secured. When the eccentrics 106 are adjusted toward central position the throw of the valves is decreased so that the passages 112 are only partially opened. The flow of liquid to and from the motor cylinders is therefore restricted, so that the speed at which the motor can operate is reduced. By sufficiently diminishing the stroke of the valves the driving action of the motor may not only be reduced to zero, but the flow of liquid may be so restricted that the motor will act as a brake. The braking action of course will depend upon the speed of the machine, but may always be made very effective by sufficiently reducing the throw of the valves. The eccentrics 106' for operating the valves of the motor M' are adjusted by means of a rod 110' corresponding to the rod 110, and adjustable longitudinally in the hollow shaft 107' on which the eccentrics 106' are mounted.

The cam rods 110 and 110' controlling the valves for the motors M and M' are adjusted by mechanism operating in conjunction with the brake operating mechanism. By reference to Figs. 5, 6 and 7 the construction and operation of this mechanism will be readily understood. As here shown, brake pulleys 116' are mounted on the rear driving axle 117. Coöperating with each brake pulley is a brake strap 118, one end of which is secured to a stud 119 in frame A, and the other end of which is connected at 120 to a crank arm 121 secured to a rock shaft 122. A T-lever 124 is pivoted at 125 to a bracket 126 secured to the casing C. One arm of this lever is connected by a link 127 to a rock arm 128 secured to the rock shaft 122. The opposite arm of the lever 124 has a bifurcated end 129 provided with studs 130 extending into an annular recess 131 formed in a disk 132 secured to the projecting end of the shaft 110'. A rod 133 pivoted at one end to the lever 124 is connected at its opposite end to a lever 134 pivoted at 135 to a bracket 136. The inner end of the lever 134 is connected to a disk 137 secured to the end of the rod 110, this connection being similar to that between the rod 110' and lever 124. A rod 138 is pivoted to an arm 139' of the lever 124, and extends forward and is secured to a lever 139 pivoted at 96. The lever 139 has a locking pawl 140 coöperating with the rack bar 99 and operated by a finger latch 141.

With the parts in the position shown in Figs. 5, 6 and 7, the cam rod 110 is at the limit of its outward movement and the cam rod 110' is in its innermost position. The eccentrics 106 and 106' are therefore adjusted to give a full throw to the motor valves so that the motors may drive the automobile backward. The brakes are at this time released as indicated in Fig. 6, the arm 121 being in alinement with the end of the brake strap attached thereto. It will be noted that at this time the link 127 (see Fig. 5) is not in line with the pivot 125. If the hand lever 139 is now moved in a forward direction, the rod 138 will be moved rearwardly, and rotate the T-lever about its pivot 125, thereby moving the rod 110' longitudinally outward. The link 133 at the same time imparts an inward movement to the rod 110. The rods 110 and 110' thus adjust the eccentrics 106 and 106' into a position to decrease the throw of the motor valves an amount corresponding to the extent to which the hand lever 139 is moved. If the lever 139 is moved forward to a central position, the eccentrics will be adjusted to central position and the motors will be stopped. The link 127 is now in line with the pivot 125 so that the arm 128 is swung back into position to apply the brake straps with full power to the brake pulleys. At an intermediate position of the lever 139 the speed will be reduced, and as said lever is brought back toward a central position the mechanical brakes are gradually applied and the throw of the motor valves gradually reduced, so that the motors are retarded and produce a braking action coöperating with that of the mechanical brakes. If the lever 139 is moved forward beyond a central position, the rods 110 and 110' will adjust the eccentrics 106 and 106' to a position to effect the operation of the motors in a forward direction. The link 127 will at the same time be swung inward from a central position thereby pulling the arm 128 forward toward the position shown in Fig. 6 and releasing the brakes. It will thus be seen that the operation of the motors and the friction brakes is controlled by a single operating lever, and that simple and effective means are provided for controlling the machine under various conditions of operation.

The supply chamber S and pressure chamber T are preferably comprised in the casing 142 which may be a single casting, the two chambers being separated by a partition 143. Within the pressure chamber is an accumulator comprising a tube or cylinder 144, secured to the casing by plug 145 threaded into the casing and having a reduced portion 146 threaded into the tube 144. A piston 147 provided with packings 148 is slidable within the tube 144. A heavy coil spring 149 is located within the tube between the piston 147 and the plug 145. This accumulator maintains an elastic pressure on the liquid within the pressure chamber. An accumulator is also provided in the supply chamber, and comprises an end plug 150, tube 151, piston 152, a comparatively weak coil spring 153, plug 154, and a stem 155 carried by the piston adapted to engage the plug 154 to limit the outward movement of the piston. The tube 153 is provided with ports 156 to permit access of liquid to the piston. This accumulator in the supply chamber maintains a slight pressure on the liquid which has been found to be essential to a smooth operation of the mechanism. A relief valve 160 is placed between the pressure and supply chambers and is adapted to open when the pressure in the chamber T becomes excessive. The valve is normally held to its seat by a strong coil spring 161 which is under compression between the valve 160 and a nut 162 adjustable in a sleeve 163. Beneath the casing C are compartments 170 and 171 provided with doors 172 and 173 respectively. One of these compartments may be used as a receptacle for tools, etc., and the other for supplies of any kind. As the power transmitting mechanism is inclosed in a tight casing it is protected and kept free from dust and dirt and any oil that may escape by leakage from the circulating system may be pumped back into the supply chamber. The particular arrangement of the mechanism is such that economy of space is secured. The side walls of the casing C extend below the floor 3 a sufficient distance to protect the twin mufflers, water tank, radiator, etc. It will be observed that the slide valves, the pumping mechanism and motors, and also the valve controlling the supply of fuel to the engine, are all balanced so that little power is required for operating them. The cylinders for the pump and motors are preferably made of drawn steel tubes. Steel castings or aluminum may be used for the base, while the valves are preferably made of phosphor bronze.

It will be seen from the foregoing description in connection with the drawings that the engine and power transmitting mechanism are very compactly arranged and assembled as a unit which may readily be removed or replaced. The link 40 and the rods 94 and 138 extending from the hand levers to the controlling mechanism may readily be disconnected to permit the casing C to be lowered. The lowering of this casing will slacken the rear driving chains 114 which may be disconnected and removed if desired. The guides 9 prevent movement of the casing in any direction except vertically, and the ropes 10 and 11 serve to hold the casing up against the floor of the car. The lower ends of the guides 9 may be flared outwardly as shown to assist in guiding the casing C into position.

Although the invention is herein shown as applied to an automobile truck, it will be understood that it is not limited to such use. Oher forms of engines and power transmitting mechanism may also be employed within the scope of the invention. I wish therefore not to be limited to particular features of construction and arrangements of parts herein shown, as various modifications might be employed within the scope of the invention.

What I claim is new, and desire to have protected by Letters Patent of the United States is:—

1. The combination in a self-propelled vehicle of a frame, a prime mover and power transmitting mechanism, a casing inclosing said prime mover and power transmitting mechanism and located between the front and rear wheels of the vehicle, vertically depending guides carried by the frame, means mounted on the frame for lifting and lowering said casing and inclosed mechanism in said guides, and gearing detachably connecting the said power transmitting mechanism with the driving wheels.

2. The combination with a frame, of a casing, a prime mover and power transmitting mechanism within the casing, guides carried by and extending downward from the frame, lifting ropes or cables connected to said casing, a hoisting device carried by the frame and to which said ropes or cables are connected for lifting and lowering the casing and inclosed mechanism, and driving connections between the rear axle and said transmitting mechanism arranged to permit the lifting and lowering of the casing.

3. In a self-propelled vehicle, the combination of a frame work, front and rear wheels, a casing located beneath the frame work and extending downward between the front and rear wheels, mechanism mounted on the frame work and connected to said casing for lifting and lowering the latter, power generating and transmitting mechanism within the casing, and driving connections between said mechanism and the wheels of the vehicle arranged to permit the lifting and lowering of the casing without disconnecting said driving connections.

4. In a self propelled vehicle, the combination of a frame, front and rear wheels, a casing located between said wheels, means associated with said frame for lifting and lowering said casing in a vertical direction, power transmitting mechanism within the casing, and a sprocket and chain connection between said mechanism and the rear axle of the vehicle.

5. In a self propelled vehicle, the combination of a sectional casing, an engine located in one of the sections of the casing, power transmission mechanism geared to the said engine and located in another section of the casing, a frame, means for supporting said casing beneath the frame, traction wheels supporting the frame, and gearing forming a detachable driving connection between the traction wheels and said transmission mechanism.

6. In a self propelled vehicle, the combination of a frame, vertical guides secured to the frame and depending therefrom, a casing located beneath the frame between said guides, a windlass mounted on the frame and connected to the casing for lifting and lowering the latter, an engine and power transmitting mechanism located within the casing, and gearing forming a detachable driving connection between said power transmitting mechanism and the driving axle of the vehicle.

In testimony whereof, I have signed my name to this specification in the presence of two subscribing witnesses.

AUGUST SUNDH.

Witnesses:
JOHN F. RULE,
JAMES G. BETHELL.